(12) United States Patent
Westerblad et al.

(10) Patent No.: US 8,742,910 B2
(45) Date of Patent: Jun. 3, 2014

(54) IMPACT ALERT SYSTEM AND METHOD (75) Inventors: Hakan Westerblad, Stockholm (SE); Anders Eriksson, Bromma (SE)

(73) Assignees: Teknikkonsult Eriksson-Viotti Handelsbolag, Bromma (SE); Handelsbolaget Westerblad Utbildningskonsult, Stockholm (SE)

( * ) Notice: Subject to any disclaimer, the term of this patent is extended or adjusted under 35 U.S.C. 154(b) by 248 days.

(21) Appl. No.: 13/319,340

(22) PCT Filed: May 8, 2009

(86) PCT No.: PCT/SE2009/050512
§ 371 (c)(1),
(2), (4) Date: Nov. 8, 2011

(87) PCT Pub. No.: WO2010/128912
PCT Pub. Date: Nov. 11, 2010

(65) Prior Publication Data
US 2012/0050026 A1 Mar. 1, 2012

(51) Int. Cl.
*B60Q 1/00* (2006.01)

(52) U.S. Cl.
USPC .......... 340/436; 340/435; 340/438; 701/301; 180/274; 280/735

(58) Field of Classification Search
USPC .......... 340/435, 436, 903, 438, 384.7, 691.1; 280/735; 701/45, 301; 180/273, 274, 180/271, 167, 169
See application file for complete search history.

(56) References Cited

U.S. PATENT DOCUMENTS

| 3,750,171 | A | | 7/1973 | Faris |
| 3,863,253 | A | | 1/1975 | Kiyoto et al. |
| 5,450,057 | A | | 9/1995 | Watanabe |
| 5,785,347 | A | * | 7/1998 | Adolph et al. ................ 280/735 |
| 5,979,586 | A | | 11/1999 | Farmer et al. |
| 7,532,152 | B1 | * | 5/2009 | Yonak ............................ 342/70 |
| 7,741,962 | B2 | * | 6/2010 | Kalik ............................ 340/438 |
| 7,916,039 | B2 | * | 3/2011 | Hess et al. ................. 340/691.1 |

(Continued)

FOREIGN PATENT DOCUMENTS

DE 10 2004 004546 A1 8/2005
DE 10 2009 055956 A1 6/2011

(Continued)

OTHER PUBLICATIONS

International Search Report, dated Feb. 3, 2010, from corresponding PCT application.

(Continued)

*Primary Examiner* — Anh V La
(74) *Attorney, Agent, or Firm* — Young & Thompson (57) ABSTRACT

An impact alert system and method for reducing personal injury at vehicle impact, include at least one sensor arrangement adapted to monitor the surroundings of a vehicle, and to generate surrounding signals dependent thereon, a control unit adapted to receive the surrounding signals, and to evaluate the signals in order to predict an impact situation depending on the signals: The control unit is further adapted to, provided that an impact situation is predicted, determine the impact situation depending on the signals, and to determine an optimal muscle activation for an occupant for the impact situation, whereby the system is adapted to make an occupant in vehicle start achieve the optimal muscle activation before the impact situation.

28 Claims, 8 Drawing Sheets

(56) References Cited

U.S. PATENT DOCUMENTS

2004/0178890 A1 9/2004 Williams et al.
2006/0001532 A1 1/2006 Nagata
2008/0188996 A1 8/2008 Lucas et al.

FOREIGN PATENT DOCUMENTS

| EP | 0 367 404 A2 | 5/1990 |
|---|---|---|
| FR | 2 828 154 A1 | 2/2003 |
| WO | 97/25630 A1 | 7/1997 |
| WO | 03/049976 A1 | 6/2003 |
| WO | 2008/036005 A1 | 3/2008 |
| WO | 2008/041904 A1 | 4/2008 |
| WO | 2008/115103 A1 | 9/2008 |

OTHER PUBLICATIONS

European Search Report, dated Aug. 21, 2012, from corresponding European application.

* cited by examiner

IMPACT ALERT SYSTEM AND METHOD

FIELD OF THE INVENTION

The present invention relates to a safety system in vehicles and to an impact alert method according to the preambles of the independent claims.

BACKGROUND OF THE INVENTION

An impact incident of a vehicle leads to large, positive or negative, accelerations. In connection thereto large forces are created in the vehicle. The vehicle occupants are exposed to the corresponding accelerations and force effects. By the passive protection systems existing in vehicles, mainly seat belts, a large part of the energy will be absorbed, but they principally protect the torso. Collision effects on the neck and head, above the seat belt, thus often lead to great accelerations and considerable damages on the skeleton, muscles and other soft tissues. Many safety systems focus on preventing so called whiplash injuries where movement of the neck and head often causes injuries, when a motor vehicle is hit from the rear. Several systems for preventing such injuries are known. For example, the back of a car seat can be mounted in such a way that the upper part of the seat back or head rest can move forwardly to support the head of the occupant and also in such a way that the seat back can subsequently yield during a rear impact. By those means, the torso of an occupant can be caused to de-accelerate in a more gradual manner, and the head of the occupant can be supported, thus reducing the risk of injury. Examples of this kind of system are disclosed in the international patent applications WO/2008/036005 and WO/2008/115103. Other examples of restraint systems are motorized seatbelt retractors and movable support surfaces, such as knee paddings or systems that provide additional support for bracing a vehicle occupant (see for example WO/2008/041904).

Some recently developed systems are activated in response to a detected crash risk, for instance if the relative position and velocity of another vehicle, as detected by on-board radar for example, indicate that a crash situation is likely or unavoidable. Such systems could also react in response to detected hazardous vehicle dynamic situations, and such situations may be detected by on-board sensors such as accelerometers. Systems for e.g. braking the car as a preparation for an estimated impact are known.

A problem with existing reversible restraint systems is that the systems generally are applied quickly and without warning. Sudden activations of such systems may be uncomfortable and/or alarming for a vehicle occupant. There is also a risk that a restraint system will be removed before the occurrence of a new potentially hazardous situation, or that the use of the restraint system is detrimental for certain impact directions. Moreover, the systems incorporate mechanical solutions and hence can be bulky and also costly for producing and mounting.

A device that intends to prevent personal injury at a car collision by generating a warning signal to occupants to achieve a muscular tensioning is disclosed in the international application WO 97/25630. The warning signal causes a reflex action from the occupants, to tense their muscles in order to absorb the effects of the collision. The device is thus a rather elementary construction and does not, for example, take regard of from where the collision arises.

The object of the present invention is to reduce personal injury at vehicle impact dependent of the nature of the impact.

SUMMARY OF THE INVENTION

The above-mentioned object is achieved by an impact alert system and method for reducing personal injury at vehicle impact according to the independent claims of the present invention.

The system comprises at least one sensor adapted to monitor the surroundings of a vehicle, and to generate surrounding signals dependent thereon, a control unit adapted to receive the surrounding signals, and to evaluate the signals in order to predict an impact situation depending on the signals. The control unit is further adapted to, provided that an impact situation is predicted; determine the impact situation depending on the signals, and to determine an optimal muscle activation for an occupant for the impact situation, whereby the system is adapted to make an occupant in the vehicle start achieve the optimal muscle activation before the impact situation.

The method comprises the steps of: monitoring the surroundings of a vehicle, and generating surrounding signals dependent thereon, applying the surrounding signals to a control unit, and evaluating the signals in order to predict an impact situation depending on the signals. Provided that an impact situation is predicted, the method comprises determining the impact situation depending on the signals, determining an optimal muscle activation for an occupant for the impact situation, and making an occupant of the vehicle start achieve the optimal muscle activation before the impact situation.

It is further an aim of the invention to solve one or more of the above stated problems, that is cheap and does not comprise any mechanical, moving parts and that can be reactivated unlimited numbers of times.

By applying the present invention the occupant's muscles are advantageously activated in order to minimize injury, based on expected impact characteristics. By detecting surrounding objects and hence a possible imminent impact, also detecting and calculating the characteristics of the impact such as the direction, velocity and expected impact degree and time, a tailored warning signal is subsequently generated.

The warning signal of some kind (preferably sound) will at the appropriate time make the occupant aware of the impact characteristics such as impact direction. The signal is tailored to activate the desired optimally placed muscles which will prevent and reduce the degree of injury, for the determined impact parameters.

The system may incorporate detecting devices such as accelerometers that characterize the vehicle situation and detect hazardous situations (such as roll-overs, emergency braking). A warning signal is thus generated to prepare the vehicle occupant, and the occupant's muscular system, for a possible crash. By using e.g. synthetic sounds, a sound effect can be created which draws the occupants' attention in the best possible direction (which is not necessarily in the direction of the incoming object, for all impact directions, and for all situations). Similarly, it is obvious that such different sound effects can be given to the different seats of the vehicle, considering the relative positions and situations.

Preferred embodiments are set forth in the dependent claims.

The invention will now be described in conjunction with the figures.

DETAILED DESCRIPTION OF PREFERRED EMBODIMENTS OF THE INVENTION

Figure 1:
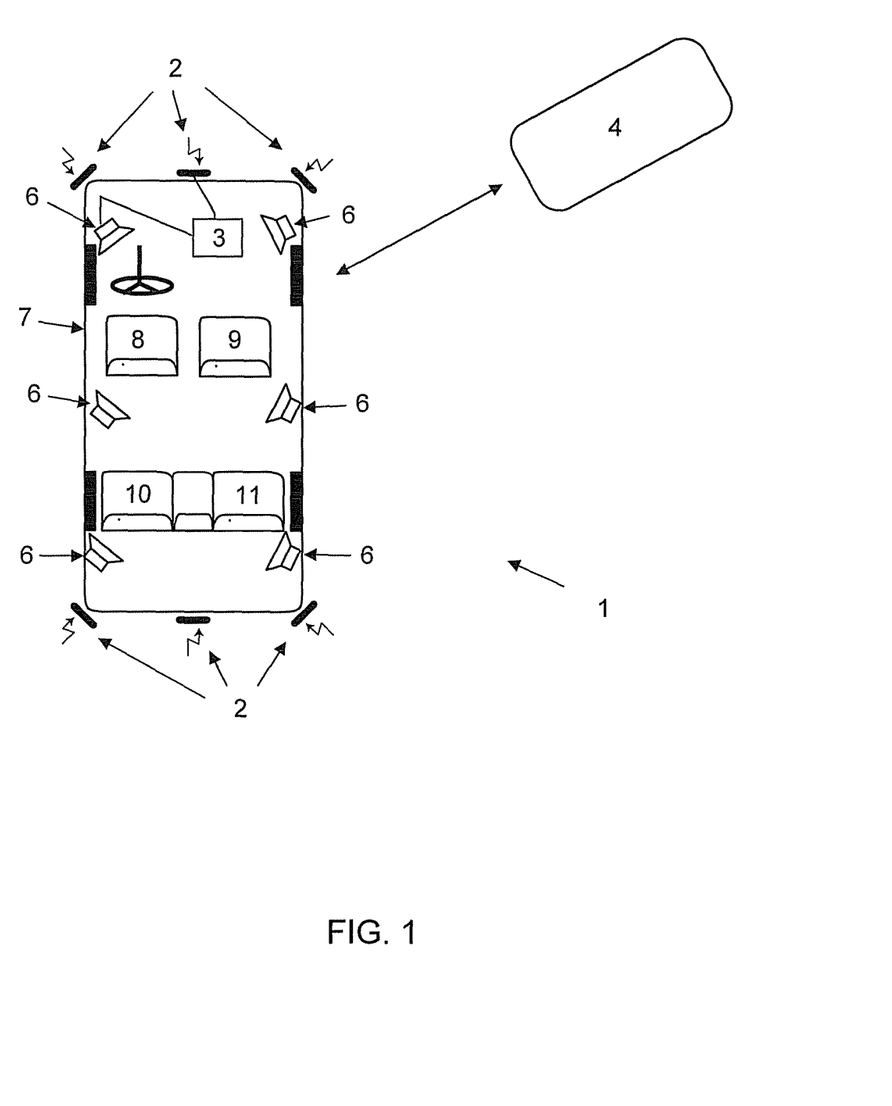
FIG. 1 illustrates a view from above of an approaching impact situation according to the invention.

The present invention is schematically illustrated in FIG. 1. It is based on first detecting a possible impact with an object 4 or detecting other hazardous situations that could result in an accident/crash. For example, if there is a risk that the own vehicle 7 will collide with a still standing object, e.g. a tree, this situation is also detected. Such an impact, accident or crash is hereinafter referred to as an impact situation. To be able to detect a possible impact situation the impact alert system according to the invention comprises at least one sensor arrangement 2 adapted to monitor the surroundings of a vehicle, and to generate surrounding signals dependent thereon. The at least one sensor arrangement 2 may be mounted around the vehicle 7 to monitor the surroundings. The sensor arrangement 2 may comprise transmitters and/or receivers, and may be one of many sensor arrangements used in vehicles and known to the person skilled in the art. Examples are sensors for obstacle detection (distance and direction of movement), which can be based on electromagnetic radiation, sound or light. Common examples are radar (microwave, infrared), lidar, infrared detectors and cameras (stereo, infrared, visible spectrum). Transponders may also be used, and transponder signals may be received from other vehicles etc. to find out which type of vehicle that is involved in the impact situation. Accordingly, it is possible to monitor the surroundings of a vehicle 7 in a very accurate manner to detect possible impact situations.

Radar can provide an output related to the distance to an object and/or the relative speed between the object and the sensor, to improve the ability to discriminate between different potential impact situations. If a Doppler radar is utilised, an output can easily be provided which represents the relative velocity between the sensor and a nearby obstacle. If a pulse radar is used, the time delay of the reflected pulse will provide an indication of the distance to the object.

The sensor arrangement 2 is preferably mounted on the exterior of the vehicle 7, for example in front of or behind a windscreen or windshield provided on the vehicle 7. The sensor arrangement 2 could also be mounted above the windscreen. The sensor arrangement 2 preferably comprises sensors 2 that are positioned around the periphery of the whole vehicle 7, in order to estimate impact parameters as best as possible.

The sensor arrangement may according to one embodiment comprise internal sensors for monitoring the behavior of the occupants. If an occupant is falling asleep, or if the driver starts acting irrationally, this may be sensed by using infrared detectors or cameras (stereo, infrared, visible spectrum) or other kinds of sensing means for detecting such states.

Figure 2:
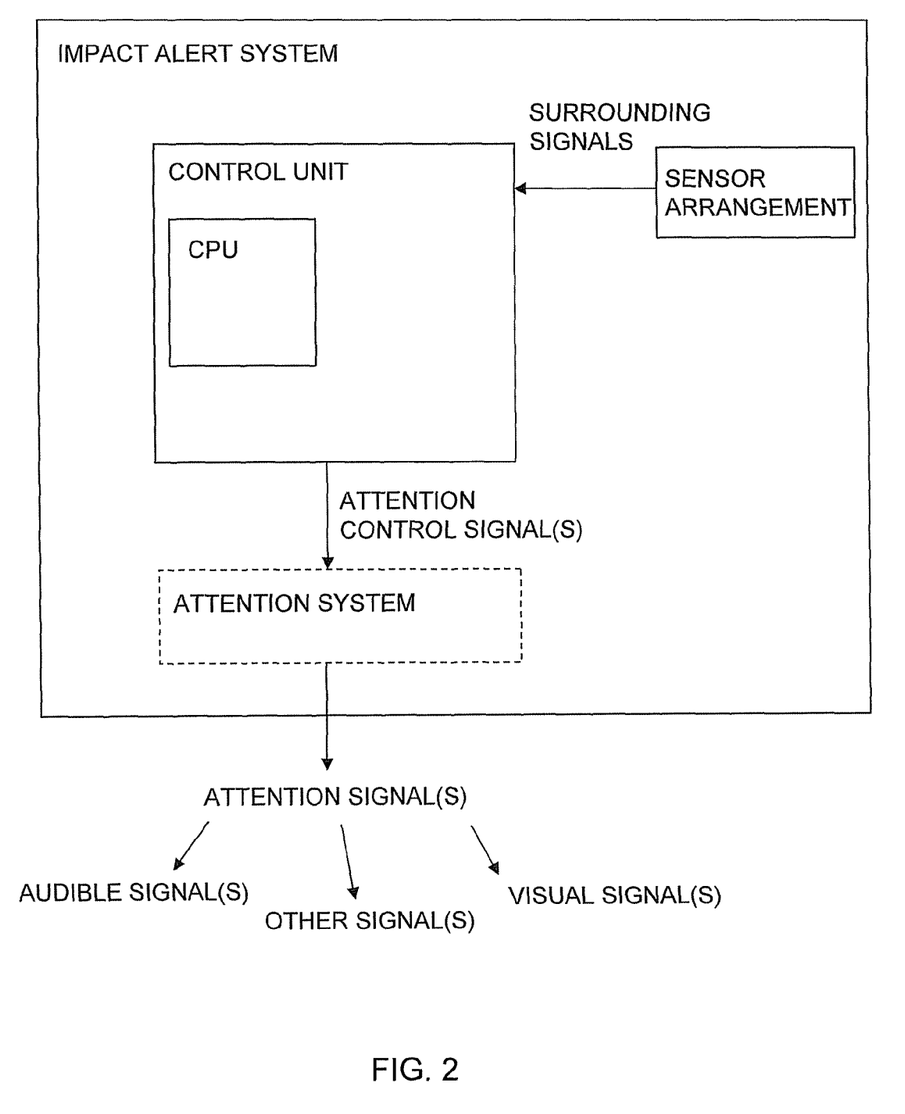
FIG. 2 illustrates a functional diagram of the impact alert system according to one embodiment of the invention.

The impact alert system according to the invention further comprises a control unit 3 adapted to receive the surrounding signals, and to evaluate the signals in order to predict an impact situation depending on the signals. A functional diagram of the system is shown in FIG. 2. The control unit 3 is positioned somewhere in the vehicle 7 and receives information from the sensor arrangement 2 either wirelessly or by wired connection. The control unit may also gain information from systems and sensors already present in the vehicle 7, for example the velocity and direction of the vehicle 7, use of seatbelts and air bags and also information if the road is slippery, if an antilock braking system of the vehicle is activated thus indicating a dangerous situation etc. The control unit 3 advantageously comprises a central processing unit or other kinds of processing arrangement to process the received surrounding signals, and based on calculations made of the processor according to various algorithms, possible impact situations are detected. For example, if a distance to another vehicle or obstacle falls below a certain threshold, then it may be determined that an impact situation is detected. If a possible impact situation is predicted, the control unit 3 determines the impact situation depending on the surrounding signals by calculating important impact characteristics for the impact situation. The control unit 3 then determines an optimal muscle activation for an occupant 8, 9, 10, 11 for the impact situation, whereby the system 1 is adapted to make an occupant 8, 9, 10, 11 in the vehicle 7 start achieve the optimal muscle activation before the impact situation. Thus, an occupant 8, 9, 10, 11 in the vehicle will be prepared for the impact situation and personal injury to that occupant 8, 9, 10, 11.

The control unit 3 may also comprise one or several filters to process information from the sensors to distinguish relevant material. Separate hardware units may be provided as processing arrangements to execute various algorithms. Alternatively one or more software controlled processors are provided as the processing arrangements to perform the algorithms. Algorithms and processing arrangements for calculating are known to the skilled in the art.

The present invention is based on using the human body's inherent muscular protection ability to prepare for an imminent crash or hazardous situation. A muscle which is intentionally activated (in a movement) in advance of an impact can create a force several times higher than the force created when the muscle responds after an impact via a neuromuscular reflex. Thus, the voluntary muscular force activated before the impact (whereas the reflex occurs as a consequence of it) results in a much higher mechanical work, and thereby reduces the impact energy on the body. The deliberate and selective activation of the human muscular system is the main idea of the invention.

It is physiologically well-known that force production in muscles is time-dependent. There is a delay in the force production, from the instance a voluntary signal from the brain, or a reflex emanating from external effects on the body, starts to activate the muscle. There is also a significant difference in the magnitude of the voluntary force and the reflex-based force. The force created in the muscle is directly related to mechanical work, when the muscle is acting eccentrically, e.g., when it is stretched during the de-acceleration of the body after impact. This mechanical work corresponds to the absorption of the kinetic energy, and is thereby reducing the impact energy on the human body. Thus, if the force created in the muscle is large, it can absorb a larger portion of kinetic energy acting on the muscle and thus sustain an impact better.

Figure 7:
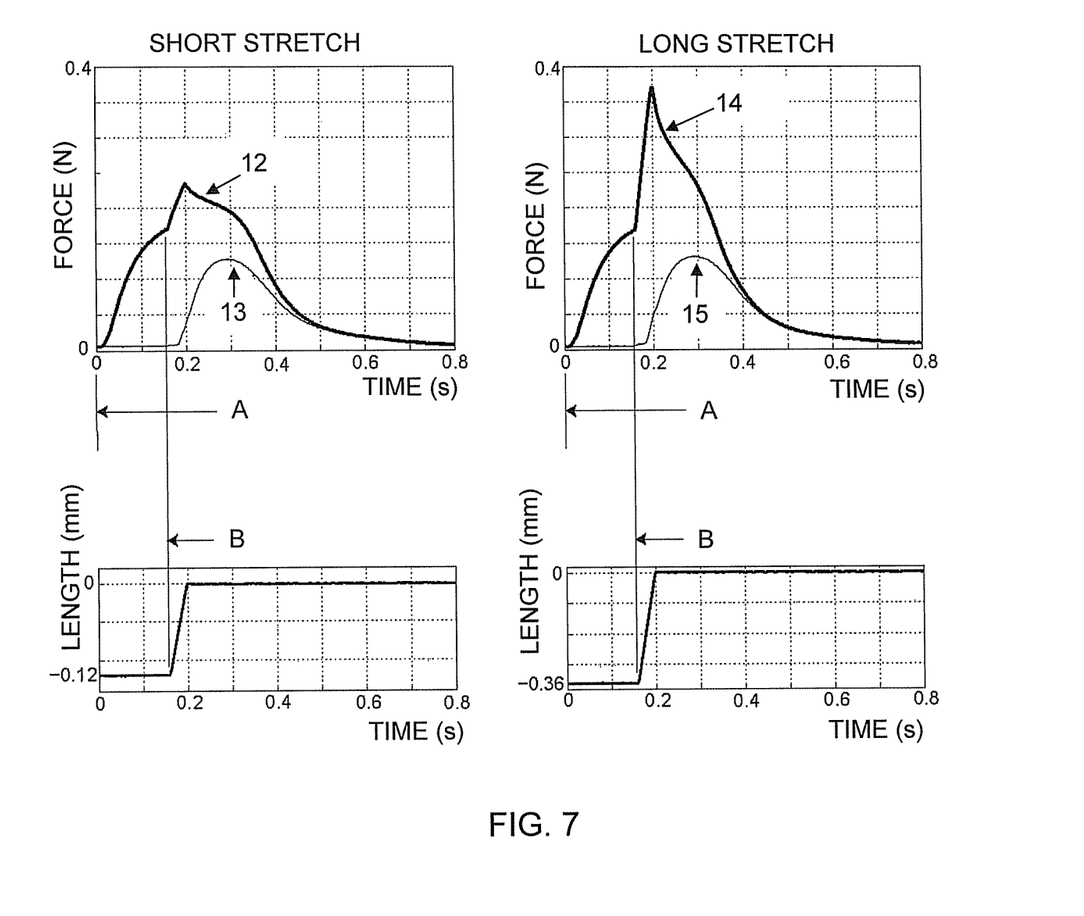
FIG. 7 illustrates typical examples of force delay in a force versus time curve of a limb muscle.
Figure 8:
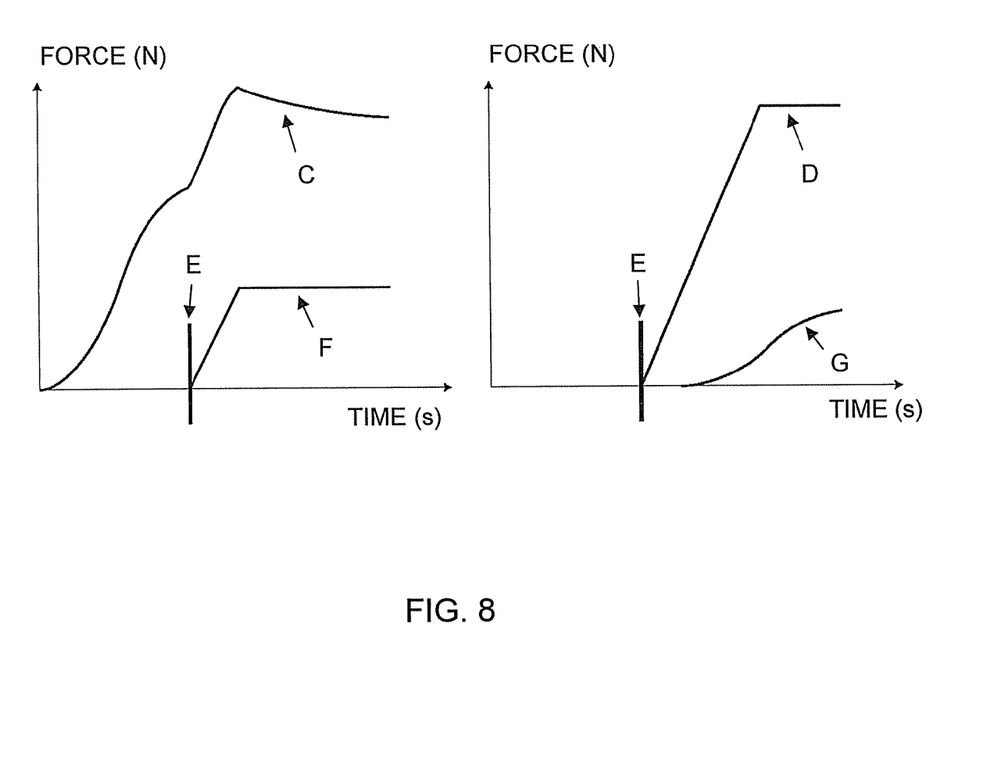
FIG. 8 illustrates the effects of muscular pre-activation in an impact situation.

This is illustrated in FIG. 7, which shows experiments on the force response (upper diagrams) to an enforced increase in the muscle length (lower diagrams). In one case the muscle stimulation started 0.15 s before the stretch (upper curves 12, 14 in upper diagrams), thus a pre-activated force. The start of the pre-activation is indicated with A. In the other case stimulation started at the same as the stretch (lower curves 13, 15 in upper diagrams), thus a reflex force. The start of the stretch and the start of the reflex are indicated with B. In both cases stimulation ended at 0.3 s. Thus, with pre-activation the force during the stretch was at least five-fold larger than without pre-activation. It should be noted that with an isolated reflex response there is also a delay between the start of the stretch and the start of force production in the size of some tens of milliseconds (about 0.04 s), which makes the force production during the stretch even smaller than that shown in FIG. 7. The implication of this is illustrated in the principal FIG. 8, which describes the effects of muscular pre-activation in an impact situation. The left diagram in FIG. 8 illustrates a pre-activated muscle during impact stretch. The right diagram in FIG. 8 illustrates a reflex muscle during impact stretch. The time of the impact is in both diagrams indicated by E. The FIG. 8 shows that a pre-activation starts the muscular force production earlier, gives a considerably higher muscular force (curve C compared to curve G), and thereby reduces the body movements, characterized by the enforced stretch of the muscle considered (curve F compared to curve D). The invention aims at a maximal employment of this muscular protection, by ensuring that muscles are voluntarily activated (not by reflex), and by an early recruitment (before the event, not as a consequence); the muscular force during the very important first phase of an impact event is thereby at least tenfold higher. It is well known from clinical experience that a crash, which the occupant is aware of in advance, causes considerably less injuries. Accordingly, with a larger and earlier introduced force in the muscle, the muscles may stop a beginning movement considerably better than if the muscles are not activated. In a simplified simulation the general effect has been shown; for a simplified model with simplified damage criteria, a occupant could sustain a crash at about double the speed when prepared, compared to the unprepared situation, when muscle activity was started by a reflex to the crash. For example, if an air bag is released at an impact, pre-activated muscles can delay and minimize the initial movement before the air bag stops further movement of the occupant. This is advantageous to minimize harm to the occupant.

The impact alert system according to the invention is preferably adapted to make an occupant 8, 9, 10, 11 in the vehicle 7 achieve the optimal muscle activation by way of an attention system 6. Thus, by catching an occupant's 8, 9, 10, 11 attention in a certain direction, it is possible to make that occupant achieve the determined optimal muscle activation. The control unit 3 is advantageously adapted to send an attention control signal to the attention system 6 to effectuate at least one attention signal. The control unit 3 thus determines an appropriate attention control signal, based on the determined optimal muscle activation for an occupant 8, 9, 10, 11, and sends it to the attention system 6, whereby the effectuated attention signal advantageously makes the occupant 8, 9, 10, 11 move in a certain way to achieve the determined optimal muscle activation.

According to one embodiment, the at least one attention signal is an audible signal. The attention system 6 may then make use of an already existing loudspeaker system of the vehicle to send out audible signals. The attention system 6 comprises according to one embodiment several loudspeakers placed to be able to effectuate signals to several occupants in a vehicle. For example, loudspeakers may be placed in front of, beside, behind and/or above each seat in the vehicle, to be able to send out audible signals to an occupant 8, 9, 10, 11 in several directions. The loudspeakers are according to one embodiment integrated in the headrests of the vehicle. In FIG. 1 some loudspeakers 6 are illustrated at various positions in a vehicle. The audible signal is according to one embodiment gradually increased to warn the occupant 8, 9, 10, 11 that the impact situation is coming closer. The occupant may then maintain the desired optimal muscle activation until the impact situation occurs. The audible signal may also contain various kinds of synthetic and deliberately created sound effects, for example the sound of braking wheels or other kinds of impact sounds.

According to one embodiment, the at least one attention signal is a visual signal. The attention system 6 comprises according to one embodiment several visual means, such as lamps or laser, placed to be able to effectuate signals to several occupants in a vehicle and from different directions. The visual means may be placed in the same way as the above-mentioned loudspeakers, and the visual signal may be a flashing light, a light with gradually increasing intensity etc.

The attention signals may according to one embodiment be a combination of audible signals and visual signals. The attention system 6 may also incorporate a vibration system to draw an occupant's 8, 9, 10, 11 attention to an upcoming impact situation, e.g. by vibrations in the steering wheel or seat. Frequency, amplitude and Doppler effects may thus be included in the attention signal to be chosen for maximally effective appearance and reflection of the impact characteristics that have been determined. Preferably, a direction of the impact situation is indicated in the attention signal to make the occupants 8, 9, 10, 11 in the vehicle 7 make a voluntary muscle movement towards that direction, or in another direction which creates a more favourable muscle activation. Other kinds of signals are also possible to draw an occupant's attention in a certain direction.

The impact situation may be determined in a plurality of ways. The use of radar to detect a distance to another vehicle is known from e.g. U.S. Pat. No. 3,863,253. To use Doppler radar to measure range and velocity between two vehicles is known from e.g. U.S. Pat. No. 3,750,171 and EP patent No 0,367,404. From US application 2008/0188996 it is known how to calculate a position of another vehicle 4 relative to the own vehicle 7. This application also discloses a way to distinguish vehicles travelling in another lane than the own vehicle 7, and which thus do not constitute a threat to the own vehicle 7. According to one embodiment, the control unit 3 is adapted to determine a relative hit direction for the impact situation. The relative hit direction is one component of a relative impact vector for the impact situation. If it is known from which relative hit direction the impact is most likely to occur, then the optimal muscle activation may be determined according to that direction. The relative hit direction of an impact situation involving another vehicle 4 or obstacle and the own vehicle 7 may be determined by sensing the direction and velocity of another vehicle 4 or obstacle in relation the direction and velocity of the own vehicle 7, and processing these signals in the control unit 3. The direction and velocity of another vehicle 4 may be determined by processing surrounding signals generated from the sensor arrangement(s) 2 in the control unit 3. The direction and velocity of the own vehicle 7 may be determined from parameters gained from the own vehicle 7. In many cases an optimal muscle activation is achieved by drawing an occupant's 8, 9, 10, 11 attention to face in the direction of the upcoming impact situation, i.e. to send out an attention signal in the direction from which the impact situation is determined to occur, with other words in: the direction of an estimated point of hit of the impact situation.

According to one embodiment, the control unit 3 is adapted to determine a relative hit velocity for the impact situation. If a velocity for e.g. another vehicle 4 is determined that will be part of the predicted impact situation, and the velocity of the own vehicle 7 is known or sensed, then a relative hit velocity for the impact situation may be determined which is one component of a relative impact vector for the impact situation. The optimal muscle activation may thus be determined according to that relative hit velocity. The velocity of the other vehicle 4 may be determined by processing surrounding signals gained from the sensor arrangement(s) 2. It is consequently possible to calculate for example how powerful the impact situation will be, and also to determine how soon the impact situation is likely to occur. The attention signal(s) may then be effectuated accordingly, by e.g. an audible signal that is increased in accordance with how fast the impact situation is approaching. An occupant 8, 9, 10, 11 in the vehicle may thus be given a signal that both contains information regarding direction and regarding how fast the predicted impact situation is most likely to occur.

If transponders are used, it is possible to find out which vehicle 4 that is involved in a predicted impact situation. This is important to know to in order to, for example, determine how powerful the impact will be. If e.g. a truck 4 is involved, this may be reflected in the attention signal, for example by the frequency and the amplitude of the signal.

According to another embodiment, the control unit 3 is adapted to determine a point of time for the impact situation. If it is known when a point of time for the impact situation is most likely to occur, then the optimal muscle activation may be determined according to that point of time. By knowing e.g. the velocity and the direction of another vehicle 4 (see FIG. 1) involved in a predicted impact situation, and the velocity and the direction of the own vehicle 7, a point of time for the impact situation may be determined. By processing surrounding signals from the sensor arrangement 2 in the control unit 3, these parameters may be determined. According to one embodiment, the control unit 3 is adapted to determine an optimal time t to start achieve the optimal muscle activation. This time t is advantageously determined in relation to the determined point of time for the impact situation. The time t may also be determined in relation to which muscle groups that are involved in the optimal muscle activation. Some muscle groups need more time to be activated, and the time t may then become longer. The optimal time t is preferably in the interval 0-2 seconds before the determined point of time for an impact situation. According to one embodiment, no optimal time t is determined, instead attention signals are sent out to start achieve an determined optimal muscle activation as soon as said optimal muscle activation has been determined.

The system 1 preferably makes an occupant 8, 9, 10, 11 start achieve an optimal muscle activation by sending out at least one attention signal in the interval 0-2 seconds before the point of time for an impact situation by way of an attention system as explained before. By experiments made it has been shown that this time-interval is beneficial to achieve an optimal muscle activation to sustain the impact, as it takes some important milliseconds for the muscles to become pre-tensioned. The occupants turn their bodies and heads, as a voluntary response to the stimulus, in a direction determined by the incoming attention signal, e.g. audible or visual. This movement demands and creates a pre-tension of a set of body muscles. The pre-tension in the muscles does significant work during and immediately after the impact, to make an occupant stand the impact better. A muscle which is intentionally activated (in a movement) in advance of an impact can create a force several times higher than the force created when the muscle responds after an impact via a neuromuscular reflex. Thus, the voluntary muscular force activated before the impact (whereas the reflex occurs as a consequence of it) results in a much higher mechanical work, and thereby reduces the impact energy on the body. The timing of achieving an optimal muscle activation in relation to the point of time for the impact situation may according to one embodiment be related to the muscle group that is desired to activate.

The optimal muscle activation for the impact situation is according to one embodiment determined according to certain predetermined rules based upon the direction, velocity and/or point of time for the impact situation. It is known from experiments that if an impact situation is coming from the front or from the side of the vehicle 7, the attention and muscle activation should be directed to the direction of the impact situation to counteract the forces involved in the impact in the best way. For example, at collision from the front the muscle activation should lead to stretching of legs and arms to parry the collision, and that back and neck muscles are activated.

In some situations the movement towards the incoming impact situation does not cause the optimal muscles to be pre-activated and tensioned. It may be desired to attract the attention of an occupant 8, 9, 10, 11 in another direction in order to give the best pre-tension state. This may easily be done, as the sound is fictitious, and can be designed to come from any directions. Optimal pre-tensioning in a variety of impact angles may be simulated in advance, and programmed to the control unit 3 as rules.

The present invention preferably interacts with the existing safety-arrangements in the vehicle 7. Thus, the optimal muscle activation is according to one embodiment determined in dependence on use of seat belt and/or air bag system. To avoid that an occupant 8, 9, 10, 11 slides out of the seat belt, the control unit 3 may determine an optimal muscle activation which takes use of seat belt/air bag into consideration. For example, if an impact situation on the side of the vehicle 7 is predicted, then it is important that the occupant's 8, 9, 10, 11 shoulder crossed by diagonal belt is slightly turned such that the occupant's 8, 9, 10, 11 upper body does not come beside the diagonal belt in a lap-diagonal belt. This turning of the shoulder of course has different directions depending if the occupant 8, 9, 10, 11 in the vehicle 7 is sitting on the right side or the left side, i.e. which shoulder the diagonal belt is crossing. The optimal muscle activation is thus advantageously determined in dependence on placement of an occupant 8, 9, 10, 11 in the vehicle 7. Thus, an optimal muscle activation may be determined dependent on where in the vehicle 7 an occupant 8, 9, 10, 11 is sitting. The control unit 3 is advantageously adapted to send attention control signals to effectuate different attention signals to occupants 8, 9, 10, 11 in the vehicle 7 dependent on the optimal muscle activation. Accordingly, if two occupants 8 and 9 are sitting in the vehicle 7, and an impact situation is predicted with a direction to the right side of the vehicle 7 as shown in FIG. 1, then occupant 9 should receive an attention signal coming from between the front of the vehicle 7 and direction of the impact situation, to avoid sliding out of the seat belt, and the occupant 8 should receive a signal entirely from direction of the impact situation of the vehicle 7. A similar aspect is related to air bags, or other safety systems, where a suitable pre-tension of the body's muscles together with the equipment should become optimal. When an air bag in an air bag system is employed, it can generally be stated that a minimal movement before the accident is desired. Signals may be tailor-made to make an occupant keep still.

The control unit 3 advantageously comprises a central processing unit such as a computer and a number of algorithms to perform processing of information mentioned above. The control unit 3 might also comprise one or several filters to process information. Separate hardware units may be provided as processing arrangements to execute various algorithms. Alternatively one or more software controlled processors are provided as the processing arrangements to perform the algorithms. Algorithms and processing arrangements for calculation are known to the skilled in the art.

Figure 3:
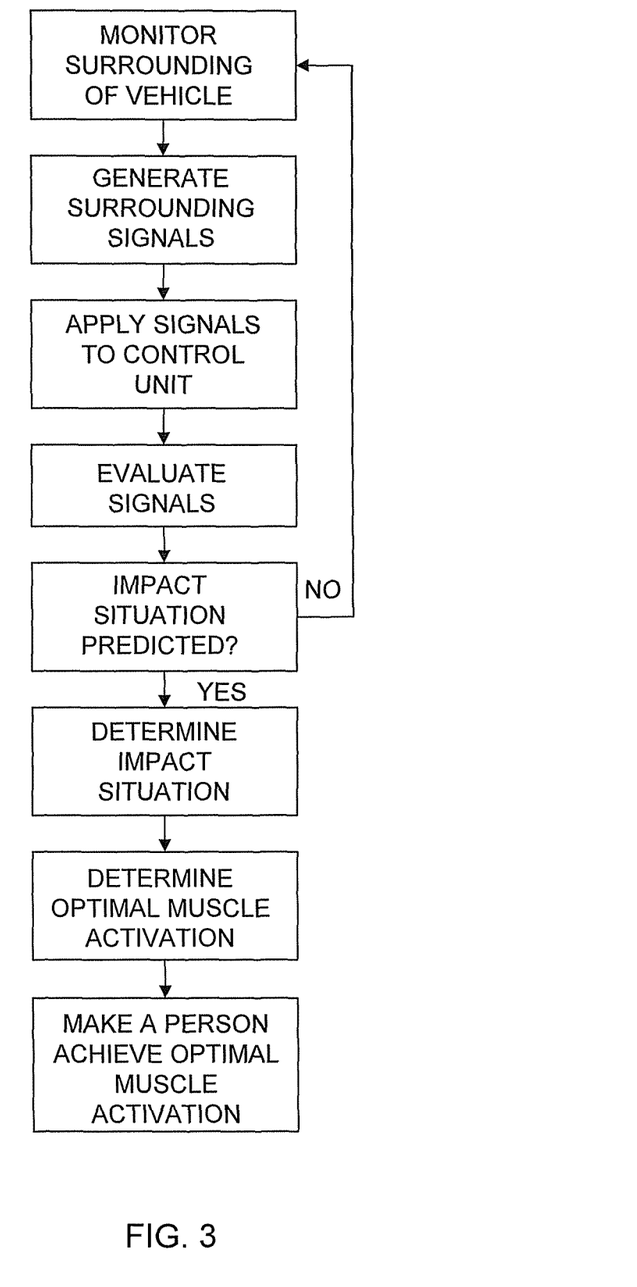
FIG. 3 shows a flowchart of an impact alert method according to one embodiment of the invention.

The present invention further relates to an impact alert method for reducing personal injury at vehicle impact which will now be described in conjunction with the flowcharts in FIGS. 3 to 6. As illustrated in FIG. 3, the surroundings of a vehicle 7 are monitored, and surrounding signals are generated dependent thereon. Then the surrounding signals are applied to a control unit 3, where they are evaluated in order to predict an impact situation depending on the signals. Also the behaviour of the occupants in the vehicle may be monitored from the interior of the vehicle, to detect occupant states that may be hazardous. Other signals from the vehicle, such as use of ABS or sensing of a slippery state of the road may be used to predict an impact situation. This procedure is continued until an impact situation is predicted. If that is the case, the control unit determines the impact situation depending on the signals, and an optimal muscle activation for an occupant 8, 9, 10, 11 for the impact situation. Then the system makes an occupant 8, 9, 10, 11 in the vehicle 7 start achieve the optimal muscle activation before the impact situation. Thus, the injuries of an occupant 8, 9, 10, 11 in the vehicle may be reduced.

It is by experiments well known that the location and degree of the injuries are affected of if the injured person has been aware of the coming collision, with often considerably extensive injuries if the person has been unaware of the collision. This may be derived from the degree of activation of the protecting musculature on mainly the front and back side of the neck. A natural reaction on an upcoming collision is a panic based total activation of most of the muscles in the body, among them they which best protect against the collision, but also their antagonists, their counteracting muscles. It is also noted that in many impact situations, at best, it is only the driver that is aware of what is happening, while the passengers often are totally unprepared. Experiments have shown that a pre-tensioning of the muscles in the neck manages an essentially increased velocity of the impact.

Figure 6:
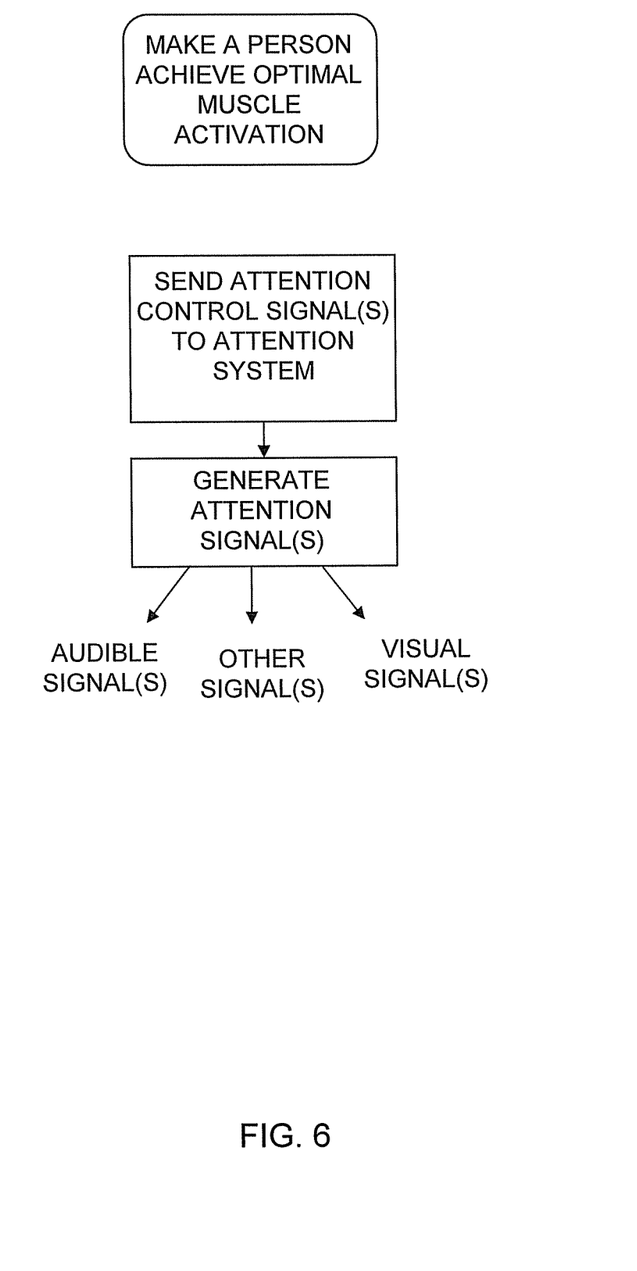
FIG. 6 shows the steps of making an occupant start achieve an optimal muscle activation according to one embodiment of the invention.

The method of achieving an optimal muscle activation is now explained in conjunction with FIG. 6. According to one embodiment, the system 1 is making an occupant 8, 9, 10, 11 in the vehicle 7 achieve the optimal muscle activation by way of an attention system 6. The control unit 3 is then preferably sending an attention control signal to the attention system 6 to effectuate at least one attention signal. The attention signals may be various kinds of signals, and according to one embodiment the attention signal is an audible signal, generated from an e.g. loudspeaker. According to another embodiment, the effectuated attention signal is a visual signal, generated from a lamp, a laser or other kinds of visual means. Other kinds of signals are also possible. Thus, by using an attention system 6 to make an occupant 8, 9, 10, 11 turn its attention from where the attention signal(s) is coming, an optimal muscle activation is achieved and personal injury may be reduced at an impact.

Figure 4:
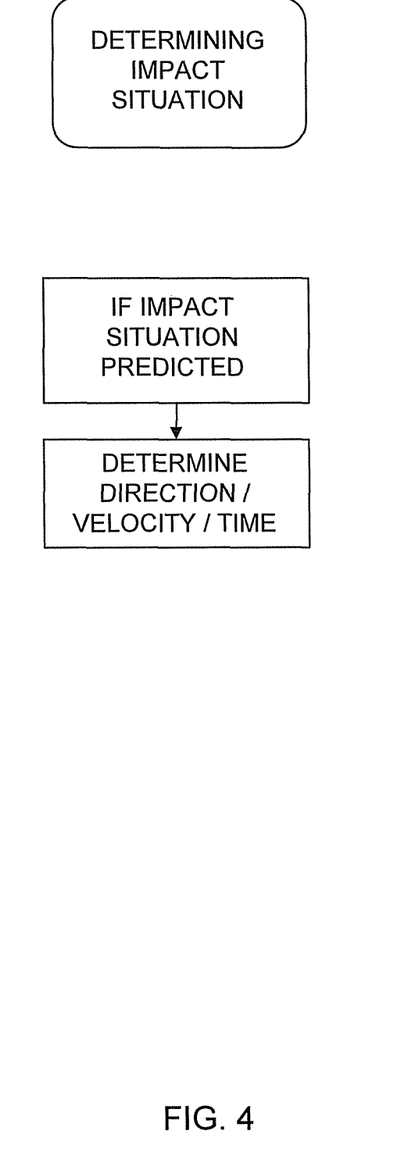
FIG. 4 shows the steps of determining an impact situation according to one embodiment of the invention.

If an impact situation has been predicted, then characteristics for the impact situation are advantageously determined as illustrated in FIG. 4.

Figure 5:
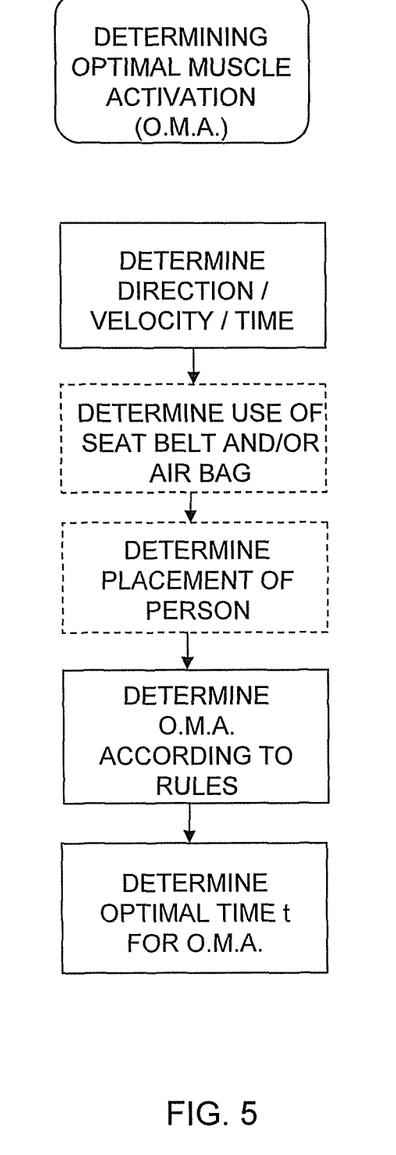
FIG. 5 shows the steps of determining an optimal muscle activation according to one embodiment of the invention.

The step of determining an optimal muscle activation is illustrated in FIG. 5 and comprises according to one embodiment that the control unit 3 is determining a relative hit direction for the impact situation. In many impact situations, an optimal muscle activation is achieved if an occupant 8, 9, 10, 11 is turning its head and upper body against the direction of the impact situation. Advantageously at least one attention signal is then generated to make the occupant 8, 9, 10, 11 turn in desired direction.

The control unit 3 is according to one embodiment determining a relative hit velocity for the impact situation, as illustrated in FIG. 5. If a relative hit velocity for the impact situation is known, it is possible to calculate how fast the predicted impact situation is arising. This velocity may be reflected in the generated attention signal.

According to a further embodiment, the control unit 3 is determining a point of time for the impact situation, see FIG. 5. By determining a point of time for the impact situation, it is possible to reflect the time limit for the impact in the attention signal(s), by e.g. generating a constantly increasing sound signal up to the point of time for the impact situation. According to one embodiment, the control unit 3 is determining an optimal time t to start achieve the optimal muscle activation. Then, the muscles will have time to become optimally activated at the time of the impact. This time t is advantageously determined in relation to the determined point of time for the impact situation. According to one embodiment, the control unit 3 is determining an optimal time t being in the interval 0-2 seconds before the point of time for an impact situation. By sending out attention signals in the interval 0-2 seconds before the determined point of time for the impact situation, the muscles will have time to achieve the determined optimal muscle activation. The occupant's 8, 9, 10, 11 attention will then be drawn to the direction from where the attention signal is sent out, before the impact occurs, and by this addressed attention capturing of an optimal muscle activation in a correct direction is achieved. According to one embodiment, the control unit 3 is not determining an optimal time t, instead attention signals are sent out to start achieve an determined optimal muscle activation as soon as said optimal muscle activation has been determined.

According to one embodiment, the control unit 3 determines an optimal muscle activation for the impact situation according to certain predetermined rules based upon the direction, velocity and/or point of time. A predetermined rule may e.g. be to obtain an occupant's 8, 9, 10, 11 attention to the front of the vehicle 7, if the impact situation is detected and determined with a relative hit direction from the front of the vehicle 7. Attention signal(s) are then sent out from e.g. loudspeakers from the front side of the vehicle 7 to make the occupant 8, 9, 10, 11 achieve the desired optimal muscle activation.

Other kinds of safety systems may influence the method, and the impact alert method thus comprises, according to one embodiment, the steps of determining the optimal muscle activation in dependence on use of seat belt and/or air bag. It may for example be advantageous to make an occupant 8, 9, 10, 11 bend its shoulder against the diagonal in a lap-diagonal belt, as explained before. These directions are thus different dependent on how the lap-diagonal belt is installed in relation to the seats, and according to one embodiment the method comprises determining the optimal muscle activation in dependence on placement of an occupant 8, 9, 10, 11 in the vehicle 7. The control unit 3 is advantageously sending attention control signals to effectuate different attention signals to occupants 8, 9, 10, 11 in the vehicle 7 dependent on the optimal muscle activation, to make an occupant 8, 9, 10, 11 in the vehicle achieve the optimal muscle activation to sustain an impact independent of placement in the vehicle 7. Thus, a tailored impact alert method is achieved which is not in conflict with the other safety systems in the vehicle 7.

The impact alert method may also be used to aid other safety systems in the vehicle 7, for example when air bag(s) in an air bag system are used.

The present invention has the benefit that it is capable of detecting several subsequent impact situations and make occupants 8, 9, 10, 11 in the vehicle 7 start achieve an optimal muscle activation for a variety of subsequent impact vectors, i.e. for each detected impact situation. This is an advantage inter alia when the vehicle 7 is exposed to several impacts in a short period of time. An air bag, for example, can only be used once.

The present invention also includes a computer program product comprising computer program code means adapted to perform the steps of the method, when running on a processor, e.g. a CPU, associated with the control unit 3. The computer program code means are according to one embodiment stored on a computer readable medium, such as a compact disc or a memory device.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. An impact alert system for reducing personal injury at vehicle impact, comprising:
   at least one sensor arrangement, adapted to monitor the surroundings of a vehicle, and to generate surrounding signals dependent thereon;
   a control unit adapted to receive said surrounding signals, and to evaluate said signals in order to predict, depending on said signals, whether an impact situation will occur; and
   an attention system adapted to generate signals perceptible to an occupant of the vehicle,
   wherein said control unit is configured to, in the event that said impact situation is predicted to occur:
      determine a hit direction, relative to the vehicle, of said impact situation, and a point of time said impact situation will occur, depending on said signals;
      determine, for said occupant of the vehicle, an optimal muscle activation for said impact situation for creating a pre-tensioning of a set of muscles of said occupant that will reduce an impact energy of the impact situation upon the body of said occupant, the control unit configured to determine said optimal muscle activation according to predetermined rules based upon at least one of said determined hit direction, a detected velocity of impact situation, and said determined point of time for said impact situation, and
   initiate said attention system to cause said occupant in said vehicle to achieve said optimal muscle activation before said point of time of said impact situation.

2. The impact alert system according to claim 1, wherein the control unit is adapted to send an attention control signal to said attention system to effectuate at least one attention signal.

3. The impact alert system according to claim 2, wherein said at least one attention signal is an audible signal.

4. The impact alert system according to claim 2, wherein said at least one attention signal is a visual signal.

5. The impact alert system according to claim 1, wherein said control unit determines said optimal muscle activation based upon said determined hit direction.

6. The impact alert system according to claim 1, wherein said control unit determines a relative hit velocity for said impact situation, and determines said optimal muscle activation based upon said determined relative hit velocity.

7. The impact alert system according to claim 1, wherein said control unit determines said optimal muscle activation based upon said determined point of time that said impact situation will occur.

8. The impact alert system according to claim 7, wherein the control unit is adapted to determine an optimal time t to start achieving said optimal muscle activation.

9. The impact alert system according to claim 8, wherein said optimal time t is in an interval of 0-2 seconds prior to said point of time determined that said impact situation will occur.

10. The impact alert system according to claim 1, wherein said optimal muscle activation is determined in dependence on use of any of a seat belt and an air bag.

11. The impact alert system according to claim 1, wherein said optimal muscle activation is determined in dependence on a placement of said occupant within said vehicle.

12. The impact alert system according to claim 11, wherein the control unit is adapted to send attention control signals to effectuate a plurality of different attention signals to said occupant dependent on said determined optimal muscle activation.

13. The impact alert system according to claim 3, wherein said at least one attention signal comprises an audible signal and a visual signal.

14. The impact alert system according to claim 3, wherein said at least one attention signal comprises an audible signal and a vibration system.

15. The impact alert system according to claim 13, wherein said at least one attention signal further comprises a vibration system.

16. An impact alert method for reducing personal injury at vehicle impact, comprising the steps of:
   monitoring the surroundings of a vehicle, and generating surrounding signals dependent thereon;
   applying said surrounding signals to a control unit; and
   evaluating said signals and predicting, based on said signals, whether an impact situation will occur,
   wherein, in the event that said impact situation is predicted to occur:
      determine a hit direction, relative to the vehicle, of said impact situation, and a point of time said impact situation will occur, depending on said signals;
      determine, for an occupant of the vehicle, an optimal muscle activation for the occupant for said impact situation for creating a pre-tensioning of a set of muscles of said occupant that will reduce an impact energy of the impact situation upon the body of said occupant,
      said determining of the optimal muscle activation comprising the sub-step of applying one or more predetermined rules based upon at least one of said determined hit direction, a detected velocity of impact situation, and said determined point of time for said impact situation; and
   causing said occupant in said vehicle to achieve said optimal muscle activation before said point of time of said impact situation by way of an attention system.

17. The impact alert method according to claim 16, further comprising:
sending an attention control signal to said attention system to effectuate at least one attention signal.

18. The impact alert method according to claim 17, wherein the at least one attention signal is an audible signal.

19. The impact alert method according to claim 17, wherein the at least one attention signal is a visual signal.

20. The impact alert method according to claim 16, wherein said control unit determines the relative hit velocity for said impact situation.

21. The impact alert method according to claim 16, wherein the control unit determines an optimal time t to begin achieving said optimal muscle activation.

22. The impact alert method according to claim 21, wherein the optimal time t determined by the control unit is in the interval of 0-2 seconds before said point of time of said impact situation.

23. The impact alert method according to claim 16, wherein said optimal muscle activation is determined based on use of any of a seat belt and an air bag.

24. The impact alert method according to claim 16, wherein said optimal muscle activation is determined based on a placement of said occupant within said vehicle.

25. The impact alert method according to claim 24, wherein the control unit sends a plurality of attention control signals to the attention system to effectuate different attention signals to said occupant dependent on said determined optimal muscle activation.

26. A computer program product comprising computer program code means adapted to perform the steps of the method according to claim 16, when running on a processor associated with the control unit.

27. The computer program product according to claim 26, where the computer program code means are stored on a computer readable medium.

28. The impact alert method according to claim 17, wherein the at least one attention signal comprises an audible signal and a visual signal.

* * * * *